United States Patent
Tagaya

(10) Patent No.: US 10,225,634 B2
(45) Date of Patent: Mar. 5, 2019

(54) ELECTRONIC APPARATUS EQUIPPED WITH MICROPHONE

(71) Applicant: CANON KABUSHIKI KAISHA, Tokyo (JP)

(72) Inventor: Akira Tagaya, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/799,610

(22) Filed: Oct. 31, 2017

(65) Prior Publication Data

US 2018/0124487 A1    May 3, 2018

(30) Foreign Application Priority Data

Nov. 2, 2016  (JP) .................... 2016-215656

(51) Int. Cl.
   *H04R 1/02*    (2006.01)
   *H04N 5/225*   (2006.01)
   *H04N 7/18*    (2006.01)
   *H04R 1/08*    (2006.01)

(52) U.S. Cl.
   CPC ........... *H04R 1/028* (2013.01); *H04N 5/2252* (2013.01); *H04N 7/183* (2013.01); *H04R 1/086* (2013.01); *H04R 2499/11* (2013.01)

(58) Field of Classification Search
   None
   See application file for complete search history.

(56) References Cited

U.S. PATENT DOCUMENTS

| | | | |
|---|---|---|---|
| 6,771,788 B1 * | 8/2004 | Soutar ................ | H04R 1/083 367/174 |
| 2005/0179813 A1 * | 8/2005 | Fujii .................... | H04N 5/2252 348/375 |
| 2006/0139443 A1 * | 6/2006 | Tatamiya ............. | H04N 5/2252 348/14.02 |
| 2011/0013799 A1 * | 1/2011 | Fang .................... | H04R 1/086 381/355 |
| 2016/0157729 A1 * | 6/2016 | Abe ..................... | A61B 5/0095 600/407 |
| 2018/0013271 A1 * | 1/2018 | Goulden ............... | H02G 3/04 |
| 2018/0013934 A1 * | 1/2018 | Germe ................ | H04N 5/2252 |
| 2018/0088443 A1 * | 3/2018 | Riddiford ........... | G03B 11/041 |

FOREIGN PATENT DOCUMENTS

JP    2014-143674 A    8/2014

* cited by examiner

*Primary Examiner* — Cynthia Segura
(74) *Attorney, Agent, or Firm* — Canon U.S.A., Inc. IP Division

(57) ABSTRACT

An electronic apparatus includes a housing including a first opening through which sound is guided to a microphone, a waterproof sheet covering the first opening, and a holding member having a sound collection portion for collecting sound to the microphone between the holding member and the waterproof sheet. The holding member includes a first circular portion having a second opening through which the sound collection portion communicates with the housing, and holding the waterproof sheet between the first circular portion and the housing, and a second circular portion disposed concentrically about the first circular portion having a third opening through which the sound collection portion communicates with the inside of the housing, and holding the waterproof sheet between the second circular portion and the housing. The second opening and the third opening are disposed not to overlap on a plane parallel to the waterproof sheet in a radial direction.

20 Claims, 4 Drawing Sheets

US 10,225,634 B2

ELECTRONIC APPARATUS EQUIPPED WITH MICROPHONE

BACKGROUND OF THE INVENTION

Field of the Invention

The present disclosure relates to an electronic apparatus equipped with a microphone.

Description of the Related Art

Recently, digital cameras and monitoring cameras include a microphone for recording sound. Such digital cameras and monitoring cameras may have a waterproof and dustproof structure considering use in outdoors. In the waterproof and dustproof structure of a microphone unit, a sound hole is generally covered with a waterproof filter from the inside of a housing. Further, in order to eliminate a pressure difference between the inside of the housing and a sound collection space of the microphone while guaranteeing waterproof performance using a waterproof filter with no air permeability, a slit through which air ventilation is performed is provided in a microphone holding member. The waterproof filter is partially pressed by the microphone holding member so that the waterproof filter is not peeled off from the inside of the housing.

In a microphone holding structure described in Japanese Patent Laid-Open No. 2014-143674, a waterproof filter with no air permeability is used. In this configuration, there is a possibility that a diaphragm of a microphone is deformed due to air expansion or variation in pressure in a sound collection space, and microphone noise occurs. In order to reduce microphone noise, pressure needs to be adjusted between the sound collection space and the inside of the housing, and thus a slit for causing air to pass between the sound collection space and the inside of the housing is provided in the microphone holding member. Since the slit is formed to divide a projection pressing the waterproof filter, it is difficult to sufficiently press the waterproof filter in the portion in which the slit is formed. Therefore, when a strong water stream hits the sound hole, the waterproof filter may be peeled off and waterproof and dustproof performance cannot be guaranteed. Air ventilation is performed between the sound collection space and the inside of the housing, while not performed between the sound collection space and outside of the housing, that is, an airtight structure is provided. As a result, a lens protection member and the like accommodated in the housing may be fogged or packing may be degraded. To address this problem, a vent port for adjusting pressure and humidity needs to be provided aside from the sound hole. However, if a vent port for exclusive use is provided, the number of waterproof and dustproof components may be increased and appearance may be spoiled. Further, since places to which waterproof and dustproof processing needs to be performed increase, reliability over waterproof and dustproof performance may be lowered.

SUMMARY OF THE INVENTION

In an embodiment, an electronic apparatus includes a housing including a first opening through which sound is guided to a microphone, a waterproof sheet disposed to cover the first opening, and a holding member having a sound collection portion for collecting sound to the microphone between the holding member and the waterproof sheet, and configured to hold the microphone, wherein the holding member includes a first circular portion having a second opening through which the sound collection portion communicates with the inside of the housing, and holding the waterproof sheet between the first circular portions and the housing, and a second circular portion disposed concentrically about the first circular portion, having a third opening through which the sound collection portion communicates with the inside of the housing, and holding the waterproof sheet between the second circular portion and the housing, wherein the second opening and the third opening are disposed not to overlap on a plane parallel to the waterproof sheet in a radial direction.

Further features of the present disclosure will become apparent from the following description of exemplary embodiments with reference to the attached drawings.

DESCRIPTION OF THE EMBODIMENTS

Hereinafter, embodiments for implementing the present disclosure will be described.

First Embodiment

Hereinafter, a first embodiment of the present disclosure will be described with reference to the drawings.

A monitoring camera will be described as an example of an electronic apparatus.

Figure 1:
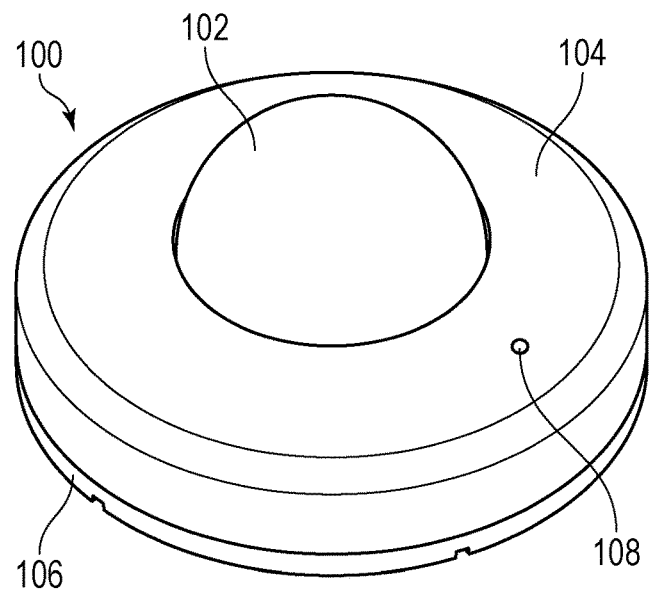
FIG. 1 is a perspective view of an exterior of an image capturing apparatus equipped with a microphone holding structure according to a first embodiment of the present disclosure.

FIG. 1 is a perspective view of the entire monitoring camera equipped with a microphone holding structure according to the first embodiment of the present disclosure. A monitoring camera 100 is capable of capturing and recording images, and recording sound. The monitoring camera 100 includes a housing which is constituted by an upper case 104 and a bottom case 106. A sound hole 108 for recording sound is formed in the upper case 104. The upper case 104 and the bottom case 106 may be manufactured by metal die casting or resin molding with polycarbonate, for example.

Figure 2:
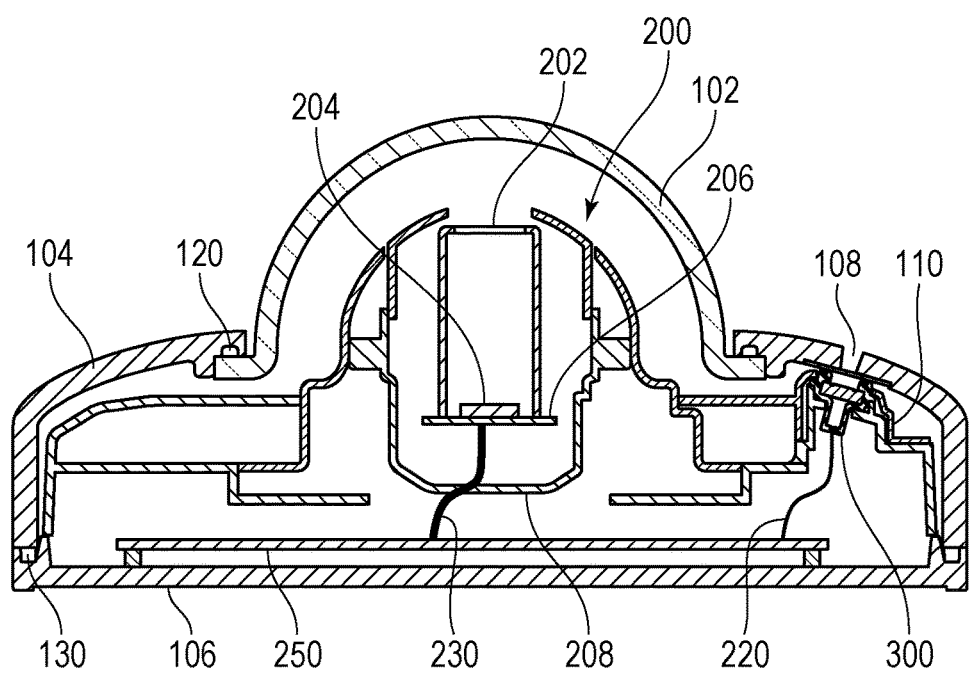
FIG. 2 is a sectional view illustrating a schematic structure of the image capturing apparatus equipped with a microphone holding structure according to the first embodiment of the present disclosure.

FIG. 2 is a sectional view illustrating a schematic structure of the monitoring camera equipped with a microphone holding structure.

The upper case 104 and the bottom case 106 are fastened to each other with screws with a packing 130 disposed therebetween. This structure makes the housing a sealed housing into which entry of water and dust particles is not allowed. The upper case 104 includes a lens protection member 102 which protects components contained in the housing from dust or impact. The lens protection member 102 is formed by transparent polycarbonate, etc. The lens protection member 102 is fixed to the upper case 104 via an O-ring 120. Other fixing methods, such as by using another component, or by using screws or an adhesive, may also be employed. The packing 130 and the O-ring 120 are made of silicon, for example, and avoid entry of water and dust from the outside.

A camera unit 200 constituted by a base case 110, a microphone holding member 300, a lens 202, an image capturing element 204, a sensor board 206, a camera housing 208, and so forth, and a control board 250 are contained in the housing.

The camera unit 200 converts light received through the lens protection member 102 and the lens 202 into electrical signals with the image capturing element 204. The image capturing element 204 is electrically connected to the control board 250 with a wire 230 or the like, and transfers obtained captured image data to the control board 250.

The control board 250 controls the entire function of the monitoring camera 100, such as power supply, camera control and connection to a network. The control board 250 is fixed to the bottom case 106 with a fixing member, such as screws.

Figure 3:
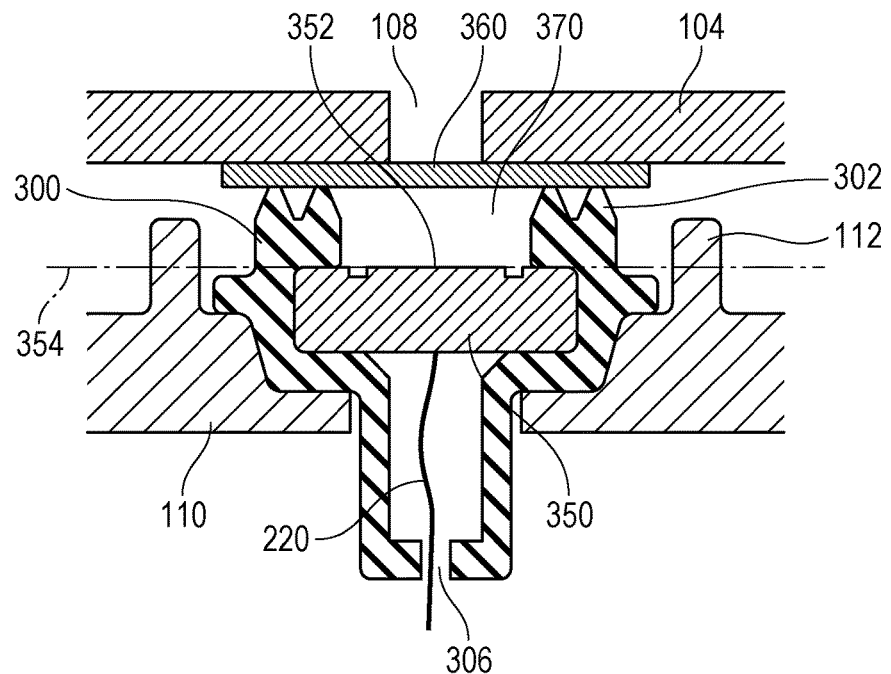
FIG. 3 is a sectional view illustrating a detailed structure of the microphone holding structure illustrated in FIG. 2.

FIG. 3 is a sectional view illustrating a detailed structure of the microphone holding structure. Air and sound pass between the inside and the outside of the housing through the sound hole 108 as a first opening formed in the upper case 104. An waterproof filter 360 with air permeability is disposed so as to cover the sound hole 108 from the inside of the upper case 104.

The waterproof filter 360 as a waterproof sheet is formed by polytetrafluoroethylene (PTFE) porous membrane, for example. Since the microphone 350 guarantees waterproof performance while having air permeability, quality of sound collected by the microphone 350 is improved. At the same time, pressure and humidity between a sound collection space 370 as a sound collection portion and the inside of the housing can be adjusted. The waterproof filter 360 is fixed to the upper case 104 by an adhesive member, such as a double-sided tape and an adhesive, however, a fixing member with screws, and a fitting member with claws may also be used.

The microphone 350 is an acoustic component which converts sound into electrical signals. The microphone 350 obtains sound through the sound hole 108 and the waterproof filter 360. The microphone 350 has a diaphragm 352 which vibrates under sound pressure, and converts obtained sound into electrical signals upon displacement of the diaphragm 352. The microphone 350 is electrically connected to the control board 250 with a microphone wire 220 or the like.

The microphone 350 is held by the microphone holding member 300, and the microphone holding member 300 is formed by an elastic member, such as silicone rubber or nitrile rubber (NBR). The microphone holding member 300 is disposed to be held by the base case 110. The sound collection space 370 is provided on the diaphragm 352 of the microphone 350. A wire holding portion 306 formed in the microphone holding member 300 holds the microphone wire 220 so as to avoid transmission of noise, such as vibration, to the microphone 350 via the microphone wire 220.

The base case 110 has a space for accommodating the microphone holding member 300. A plurality of protections (not illustrated) is formed on a wall 112 of an accommodation space, and the microphone holding member 300 is held via the projections. Therefore, contact areas between the base case 110 and the microphone holding member 300 are reduced and unnecessary vibrational noise generated from the inside of the housing can be reduced. The wall 112 of the accommodation space is formed to cover the entire circumference of the microphone holding member 300. Therefore, sound noise generated from the inside of the housing is reduced and an S/N can be improved.

Figure 4:
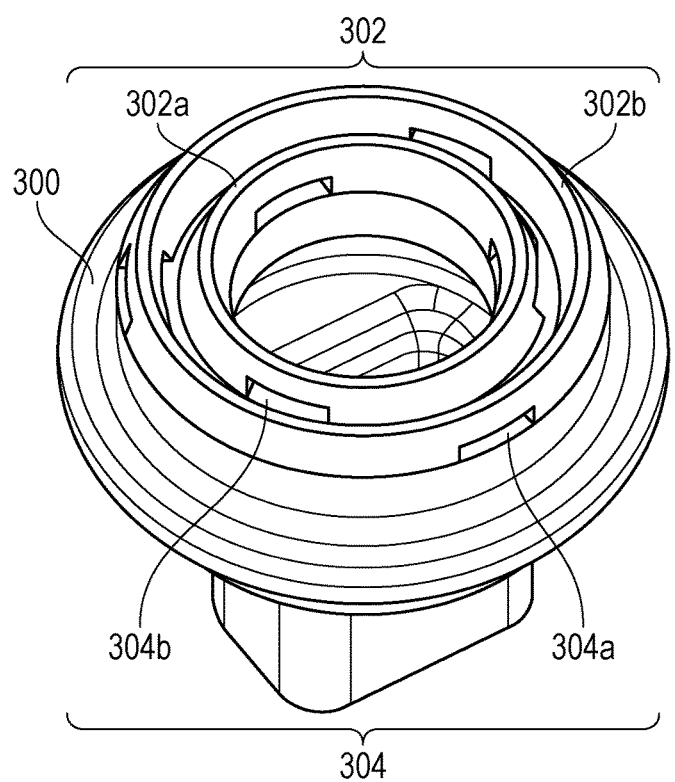
FIG. 4 is a perspective view of an exterior of the microphone holding member according to the first embodiment of the present disclosure.

Here, the microphone holding member 300 will be described in detail. FIG. 4 is a perspective view of the entire microphone holding member 300.

The microphone holding member 300 has two circular projections 302, which are disposed concentrically about a central axis of the microphone holding member 300 on an upper surface of the microphone holding member 300. Here, a plane parallel to the diaphragm 352 of the microphone 350 is referred to as a sound collection surface 354. The sound collection surface 354 is a plane parallel to the waterproof filter 360. The circular projections 302 are formed to project from the microphone 350 toward the sound hole 108 substantially vertically to the sound collection surface 354. Distal ends of the circular projections 302 are in contact with the waterproof filter 360 fixed to the upper case 104 and press the same from the inside of the housing. A cross-sectional area of each of the circular projections 302 decreases along a direction toward the outside of the housing. Each of the circular projections 302 has a substantially triangular section in the direction orthogonal to the sound collection surface 354. Therefore, the distal end of the circular projection 302 collapses easily when pressing the waterproof filter 360, so that reaction force which presses the waterproof filter 360 can be reduced. As a result, the circular projection 302 comes into contact with the waterproof filter 360 on the entire circumference thereof to guarantee waterproof and dustproof performance.

The circular projections 302 are constituted by a first projection 302a as a first circular portion (or a first portion) and a second projection 302b as a second circular portion (or a second portion). Vent ports 304 for providing paths through which air passes through the sound hole 108, the sound collection space 370 and the inside of the housing are provided on the side surface of each projection. By causing air to pass through the vent ports 304, pressure inside and outside of the housing can be adjusted. Further, since vapor ventilation becomes possible, adjustment of humidity inside and outside of the housing can inhibit fogging of the lens protection member 102 and degradation of the packing, etc. The microphone holding member 300 includes a holding portion main body holding the microphone 350, and the first projection 302a and the second projection 302b project toward the housing from the holding portion main body.

Figure 5:
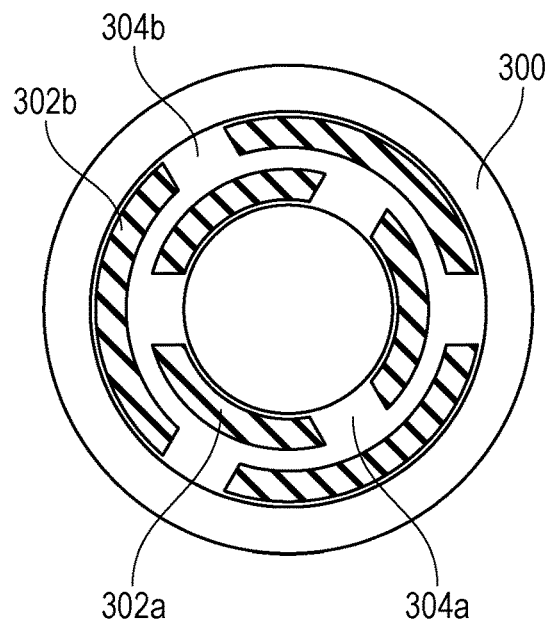
FIG. 5 is a cross-sectional view of the microphone holding member according to the first embodiment of the present disclosure.

FIG. 5 is a cross-sectional view of the vent ports 304 provided in the circular projections 302 along a plane parallel to the sound collection surface 354. Vent ports 304a as second openings formed in the first projection 302a and vent ports 304b as third openings formed in the second projection 302b are arranged alternately without overlapping in the radial direction. The vent ports 304b are disposed between adjacent vent ports 304a in the circumferential direction. That is, the vent ports 304 are formed not to divide a portion of the circular projections 302 against which the waterproof filter 360 is pressed. Therefore, the circular projections 302 can press the waterproof filter 360 across the entire plane parallel to the sound collection surface.

The region of the circular projections 302 in which the vent ports 304 are formed are lower in rigidity and thus there is a possibility that the waterproof filter 360 cannot be pressed sufficiently due to influences of reaction force to press the waterproof filter 360 and strong hydraulic pressure from outside of the housing, etc. However, the vent ports 304a provided in the first protection 302a and the vent ports 304b provided in the second projection 302b do not overlap in the radial direction. Therefore, in the positions of the vent ports 304a provided in the first projection 302a, for example, waterproof and dustproof performance is guaranteed by the second projection 302b sufficiently pressing the waterproof filter 360. The vent ports 304a are provided in the first projection 302a on the side of the holding portion main body, and the vent ports 304b are provided in the second projection 302b on the side of the holding portion main body.

As described above, according to the first embodiment of the present disclosure, a microphone holding structure capable of sufficiently pressing the waterproof filter 360 and guaranteeing waterproof and dustproof performance without providing a vent port for exclusively adjusting pressure and humidity can be provided.

In the first embodiment of the present disclosure described above, the housing is constituted by two components, however, the housing may be constituted by three or more components.

In the first embodiment of the present disclosure described above, the lens protection member 102 is spherical in shape, however, an aspherical shape, a flat plate shape, etc. may also be employed.

In the first embodiment of the present disclosure described above, the packing 130 and the O-ring 102 are used as a waterproof and dustproof unit of the housing, however, waterproof and dustproof processing by using a double-sided tape, a binding material, a sealing material, etc. may also be employed.

In the first embodiment of the present disclosure described above, a single control board 250 is used, however, a plurality of boards for camera control, power supply management, etc., may be employed.

In the first embodiment of the present disclosure described above, the microphone holding member 300 may be manufactured by combining a plurality of components. For example, the first projection 302a and the second projection 302b may be different components, for example. This avoids a complicated mold structure for forming the circular protections 302 and the vent ports 304.

In the first embodiment of the present disclosure described above, the vent ports 304 are rectangular in shape, however, the vent ports 304 may be polygonal or round in shape.

In the first embodiment of the present disclosure described above, in order to guarantee the air ventilation performance of the vent ports 304, the vent ports 304 desirably have shape and stiffness that keep the openings of the vent ports 304 even when the vent ports 304 are pressed.

Second Embodiment

Hereinafter, a second embodiment of the present disclosure will be described. The second embodiment of the present disclosure differs from the microphone holding structure according to the first embodiment of the present disclosure described above in the shape of the microphone holding member and an arrangement of the circular projections and the vent ports.

Hereinafter, differences with the first embodiment of the present disclosure will be mainly described and repeated description of the same configuration will be omitted.

Figure 6:
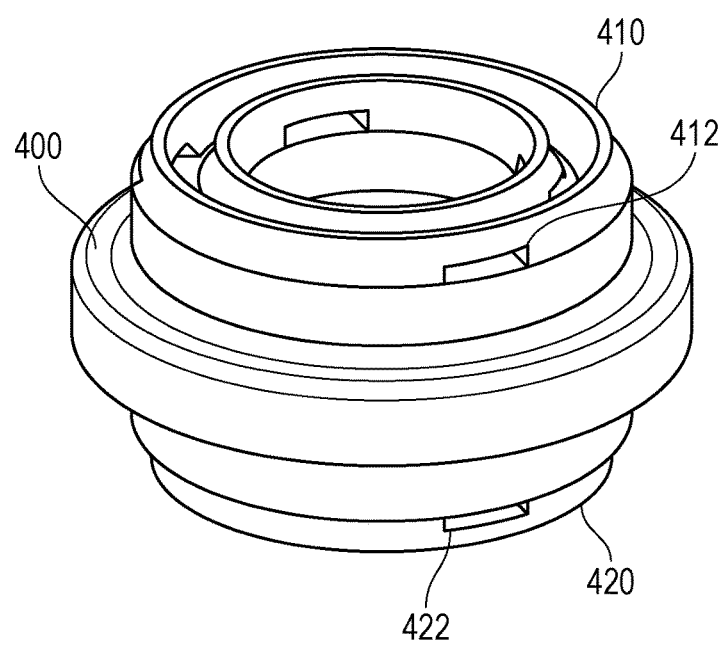
FIG. 6 is a perspective view of an exterior of a microphone holding member according to a second embodiment of the present disclosure.

FIG. 6 is a perspective view of an entire microphone holding member according to the second embodiment of the present disclosure.

A microphone holding member 400 includes two upper circular projections 410 on an upper surface thereof, and two lower circular projections 420 on a lower surface thereof. Vent ports 412 disposed in the circular projections 410 are arranged not to overlap in the radial direction and vent ports 422 disposed in the circular projections 420 are arranged not to overlap in the radial direction as in the first embodiment of the present disclosure.

Figure 7:
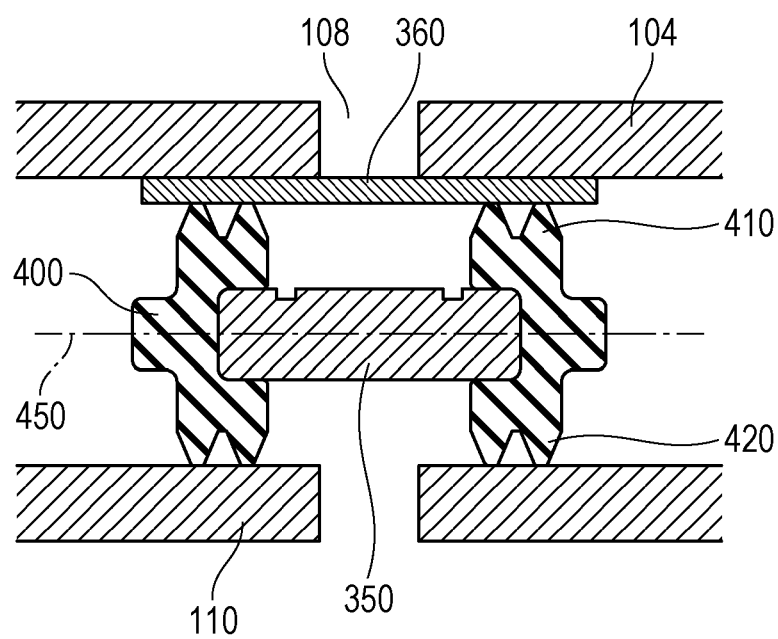
FIG. 7 is a sectional view illustrating a detailed structure of the microphone holding structure according to the second embodiment of the present disclosure.

FIG. 7 is a detailed sectional view of the microphone holding structure according to the second embodiment of the present disclosure. The microphone holding member 400 is disposed between a waterproof filter 360 disposed in an upper case 104 having a sound hole 108 and a base case 110. The microphone holding member 400 is plane-symmetrical about a surface 450 which is parallel to a sound collection surface of the microphone 350. Therefore, it is unnecessary to care about the direction of the microphone 350 when assembling the microphone 350 into the microphone holding member 300, whereby workability improves.

The upper circular projections 410 of the microphone holding member 400 are in contact with the waterproof filter 360 fixed to the upper case 104 and press the same from the inside of the housing. A cross-sectional area of each of the upper circular projections 410 decreases along a direction toward the outside of the housing, and a distal end thereof is in contact with the waterproof filter 360. By causing air to pass through the vent ports 412 formed in the upper circular projections 410, pressure inside and outside of the housing can be adjusted. Further, since vapor ventilation becomes possible, humidity inside and outside of the housing can be adjusted and fogging of the lens protection member 102 and degradation of the packing, etc. can be inhibited.

The vent ports 422 are formed in the lower circular projections 420 similarly in the upper circular projections 410. The vent ports 422 lower rigidity of the lower circular projections 420 and attenuate vibration transmitted to the microphone holding member 400. A cross-sectional area of each of the lower circular projections 420 decreases along a direction toward the inside of the housing, and a distal end thereof is in contact with the base case 110. Therefore, contact areas between the lower circular projections 420 and the base case 110 are reduced, whereby vibration is less easily transmitted. As a result, vibrational noise during collection of sound with the microphone 350 can be reduced.

Since the microphone holding member 400 is plane-symmetrical about a surface 450 which is parallel to the sound collection surface, there is no change in the effect of ventilation and the effect of vibration attenuation even if the microphone holding member 400 is disposed upside down.

According to the second embodiment of the present disclosure, the waterproof filter 360 can be sufficiently pressed and waterproof and dustproof performance can be guaranteed without providing a vent port for exclusively adjusting pressure and humidity. Further, the microphone holding structure capable of further reducing vibrational noise generated from the inside of the housing can be provided.

In the second embodiment of the present disclosure described above, the microphone holding member 400 is plane-symmetrical about the surface 450 which is parallel to the sound collection surface, however, the microphone holding member 400 may be point-symmetrical. That is, the vent ports 412 formed in the upper circular projections 410 and the vent ports 422 formed in the lower circular projections 420 may be different in phase in the radial direction.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-215656 filed Nov. 2, 2016, which is hereby incorporated by reference herein in its entirety.

What is claimed is:

1. An electronic apparatus, comprising:
a housing including a first opening through which sound is guided to a microphone;
a waterproof sheet disposed to cover the first opening; and
a holding member having a sound collection portion for collecting sound to the microphone between the holding member and the waterproof sheet, and configured to hold the microphone,
wherein the holding member includes,
a first circular portion having a second opening through which the sound collection portion communicates with the inside of the housing, and holding the waterproof sheet between the first circular portions and the housing, and
a second circular portion disposed concentrically about the first circular portion, having a third opening through which the sound collection portion communicates with the inside of the housing, and holding the waterproof sheet between the second circular portion and the housing, and
wherein the second opening and the third opening are disposed not to overlap on a plane parallel to the waterproof sheet in a radial direction.

2. The electronic apparatus according to claim 1, wherein cross-sectional areas of the first circular portion and the second circular portion decrease along a direction from the microphone to the outside of the housing.

3. The electronic apparatus according to claim 2, wherein the first circular portion and the second circular portion each have a substantially triangular section in a direction orthogonal to the plane parallel to the waterproof sheet.

4. The electronic apparatus according to claim 1, wherein a plurality of the second openings and a plurality of the third opening are provided.

5. The electronic apparatus according to claim 1, wherein the holding member has a holding portion main body configured to hold the microphone, and
the first circular portion and the second circular portion project toward the housing from the holding portion main body.

6. The electronic apparatus according to claim 5, wherein the second opening is provided in the first circular portion on the side of the holding portion main body, and
the third opening is provided in the second circular portion on the side of the holding portion main body.

7. The electronic apparatus according to claim 1, wherein the waterproof sheet is fixed to the housing via a fixing member.

8. The electronic apparatus according to claim 1, wherein the holding member is formed by an elastic member.

9. The electronic apparatus according to claim 1, further comprising:
a base case disposed on the opposite side of the housing in a direction orthogonal to the plane parallel to the waterproof sheet,
wherein one end of the first circular portion and one end of the second circular portion are in contact with the waterproof sheet, and
another end of the first circular portion and another end of the second circular portion are in contact with the base case.

10. The electronic apparatus according to claim 9, wherein the holding member is plane-symmetrical about the plane parallel to the waterproof sheet.

11. The electronic apparatus according to claim 1, wherein the housing includes a lens configured to capture an image, a lens protection member, and an image capturing element.

12. An electronic apparatus, comprising:
a housing including a first opening through which sound is guided to a microphone;
a waterproof sheet disposed to cover the first opening; and
a holding member having a sound collection portion for collecting sound to the microphone between the holding member and the waterproof sheet, and configured to hold the microphone,
wherein the holding member includes,
a first portion having a second opening through which the sound collection portion communicates with the inside of the housing, and holding the waterproof sheet between the first portion and the housing, and
a second portion disposed around the first portion, having a third opening through which the sound collection portion communicates with the inside of the housing, and holding the waterproof sheet between the second portion and the housing, and
wherein the second opening and the third opening are disposed not to overlap on a plane parallel to the waterproof sheet.

13. The electronic apparatus according to claim 12, wherein
the first portion and the second portion are circular in shape, and
the first portion and the second portion are disposed concentrically.

14. The electronic apparatus according to claim 12, wherein cross-sectional areas of the first portion and the second portion decrease along a direction from the microphone to the outside of the housing.

15. The electronic apparatus according to claim 14, wherein the first portion and the second portion each have a substantially triangular section in a direction orthogonal to the plane parallel to the waterproof sheet.

16. The electronic apparatus according to claim 12, wherein the housing includes a lens configured to capture an image, a lens protection member, and an image capturing element.

17. An electronic apparatus, comprising:
a housing including a first opening through which sound is guided to a microphone;
a waterproof sheet disposed to cover the first opening; and
a holding member having a sound collection portion for collecting sound to the microphone between the holding member and the waterproof sheet, and configured to hold the microphone,
wherein the holding member includes,
a first circular portion having a plurality of second openings through which the sound collection portion communicates with the inside of the housing, and holding the waterproof sheet between the first circular portion and the housing, and a second circular portion disposed concentrically about the first circular portion, having a plurality of third openings through which the sound collection portion communicates with the inside of the housing, and holding the waterproof sheet between the second circular portion and the housing, and wherein the third openings are disposed in positions between adjacent second openings in the circumferential direction.

18. The electronic apparatus according to claim 17, wherein cross-sectional areas of the first circular portion and the second circular portion decrease along a direction from the microphone to the outside of the housing.

19. The electronic apparatus according to claim 18, wherein the first circular portion and the second circular portion each have a substantially triangular section in a direction orthogonal to the plane parallel to the waterproof sheet.

20. The electronic apparatus according to claim 17, wherein the housing includes a lens configured to capture an image, a lens protection member, and an image capturing element.

* * * * *